United States Patent [19]

McDonald

[11] Patent Number: 4,982,128
[45] Date of Patent: Jan. 1, 1991

[54] DOUBLE AIR GAP ALTERNATOR

[76] Inventor: Maurice F. McDonald, 2416 Ave. "I", Council Bluffs, Iowa 51501

[21] Appl. No.: 473,574

[22] Filed: Feb. 1, 1990

[51] Int. Cl.$^5$ .................... H02K 21/14; H02K 16/04
[52] U.S. Cl. .................................... 310/156; 310/266
[58] Field of Search ................ 310/266, 90, 156, 261, 310/265, 269

[56] References Cited

U.S. PATENT DOCUMENTS

| | | | |
|---|---|---|---|
| 3,602,749 | 8/1971 | Esters | 310/266 |
| 4,517,484 | 5/1985 | Dacier | 310/266 |
| 4,720,650 | 1/1988 | Hanamori et al. | 310/90 |
| 4,745,318 | 5/1988 | Ivanics | 310/156 |

Primary Examiner—Steven L. Stephan
Assistant Examiner—D. L. Rebsch
Attorney, Agent, or Firm—Zarley, McKee, Thomte, Voorhees and Sease

[57] ABSTRACT

An alternator includes a generally cylindrical hollow housing with a soft iron outer core mounted therein with teeth projecting radially inwardly therefrom. Each of the outer core teeth has a wire wrapped therearound to form a coil, the coils being connected together and to at least one electrical wire extending out of the housing so as to conduct electricity induced in the coils. A tubular rotor formed of magnets is rotatably mounted on bearings at both ends within the housing, radially inwardly of the outer core and coaxial thereto. Each of the rotor magnets has one pole directed radially outwardly and its opposite pole directed radially inwardly, the magnets being arranged such that the outwardly and inwardly directed magnetic fields alternate around the rotor. A soft iron inner core is connected to the housing and mounted radially inwardly of the rotor. The inner core has teeth projecting radially outwardly therefrom, each tooth having a wire coil. The inner core coils are connected together and to at least one electrical wire extending from the housing to conduct electricity induced in the inner core coils. Rotation of the rotor will induce electricity in the coils on both the inner and outer cores.

8 Claims, 3 Drawing Sheets

DOUBLE AIR GAP ALTERNATOR

TECHNICAL FIELD

The present invention relates generally to devices for converting mechanical energy into electrical energy, and more particularly to an improved alternator with an additional set of conductor coils to produce a variety of electrical voltages.

BACKGROUND OF THE INVENTION

A machine that converts mechanical energy into electrical energy is called a generator, alternator or dynamo. The general physical principle underlying the operation of a generator is that of electromagnetic induction. If a conductor is moved through a magnetic field, a current is set up or induced in the conductor.

A generator, or alternator, consists of two basic units, the field, which is the electromagnet with its coils, and the armature, the structure that supports the conductors which cut the magnetic field and carry the induced current in a generator. The armature is usually a laminated soft iron core around which conducting wires are wound in coils. A simple generator will produce an electric current that alternates in direction as the armature revolves. It is often desirable to generate as high a voltage as possible, and rotating armatures are not practical in such applications because of the possibility of sparking between brushes and slip rings, and the danger of mechanical failures that might cause short circuits. Alternators are therefore conventionally constructed with a stationary armature within which revolves a rotor composed of a number of magnets. In such a case, the magnetic field is in motion, rather than the conductors of the armature.

The current generated by conventional alternators rises to a peak, sinks to zero, drops to a negative peak, and rises again to zero a number of times each second, depending on the frequency for which the machine is designed. Such current is known as single phase alternating current. If, however, the armature is composed of two windings, mounted at right angles to each other, and provided with separate external connections, two current waves will be produced, each of which will be at its maximum when the other is at zero. Such current is called two-phase alternating current. If three armature windings are utilized, current will be produced in the form of a triple wave, known as three-phase alternating current. A larger number of phases may be obtained by increasing the number of windings in the armature.

Conventional alternators, as described above, are utilized in a wide variety of industry to produce electrical power. However, such alternators are limited in use by their weight and size.

It is therefore a general object of the present invention to provide an improved alternator which will produce a greater amount of electricity than a conventional alternator of the same size.

Another object of the present invention is to provide an improved alternator which is capable of producing a variety of voltages simultaneously.

A further object is to provide an alternator which is capable of producing a single voltage larger than that of conventional alternators of similar weight and size.

These and other objects of the present invention will be apparent to those skilled in the art.

SUMMARY OF THE INVENTION

The alternator of the present invention includes a generally cylindrical hollow housing with a soft iron outer core mounted therein with a plurality of teeth projecting radially inwardly therefrom. Each of the outer core teeth has a wire wrapped therearound to form a coil, the coils being connected together and to at least one electrical wire extending out of the housing so as to conduct electricity induced in the coils. A hollow cylindrical rotor formed of magnets is rotatably mounted within the housing, radially inwardly of the outer core and coaxial thereto. Each of the rotor magnets has one pole directed radially outwardly and its opposite pole directed radially inwardly, the magnets being arranged such that the outwardly and inwardly directed magnetic fields alternate around the rotor. A soft iron inner core is connected to the housing and mounted radially inwardly of the rotor. The inner core has a plurality of teeth projecting radially outwardly therefrom, each tooth having a wire coil therearound. The inner core coils are connected together and to at least one electrical wire extending from the housing to conduct electricity induced in the inner core coils. A pulley is connected to the rotor so as to rotate the rotor and the magnets between the inner and outer cores. The pulley may be driven by a drive belt or the like. In the preferred embodiment, the magnets are electromagnets, and are electrically connected to a pair of slip rings mounted on one end of the rotor. A pair of electrical brushes mounted on the housing are in electrical contact with the slip rings so as to conduct direct current to the magnets to produce the electromagnets.

DESCRIPTION OF THE PREFERRED EMBODIMENT

Figure 1:
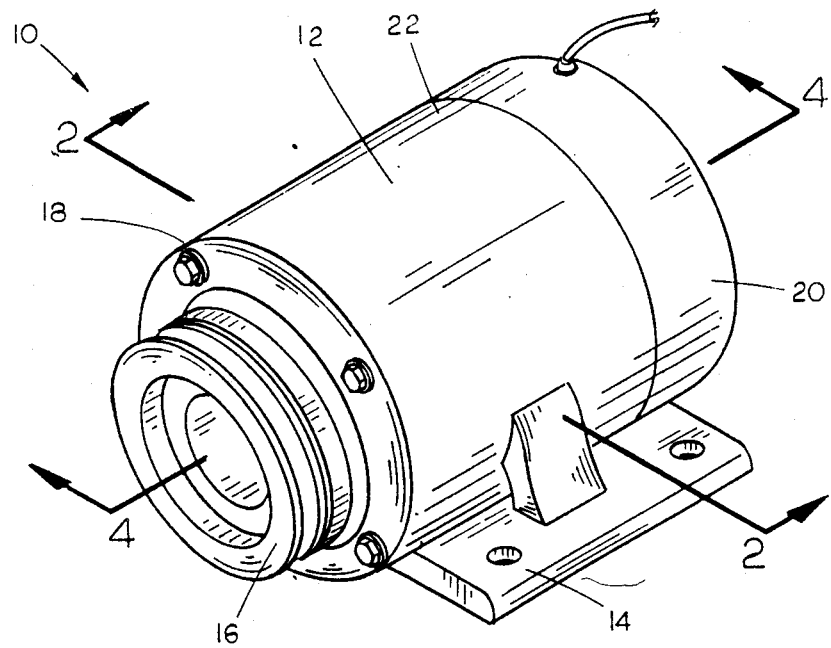
FIG. 1 is a perspective view of the alternator of the present invention.

Referring now to the drawings in which similar or corresponding parts are identified with the same reference numeral, and more particularly to FIG. 1, the alternator of the present invention is designated generally at 10 and includes a generally cylindrical housing 12 mounted on a base 14. A pulley 16 is mounted at what will be designated the forward end 18 of housing 12, and a rear plate 20 is mounted on rearward end 22 of housing 12.

Figure 2:
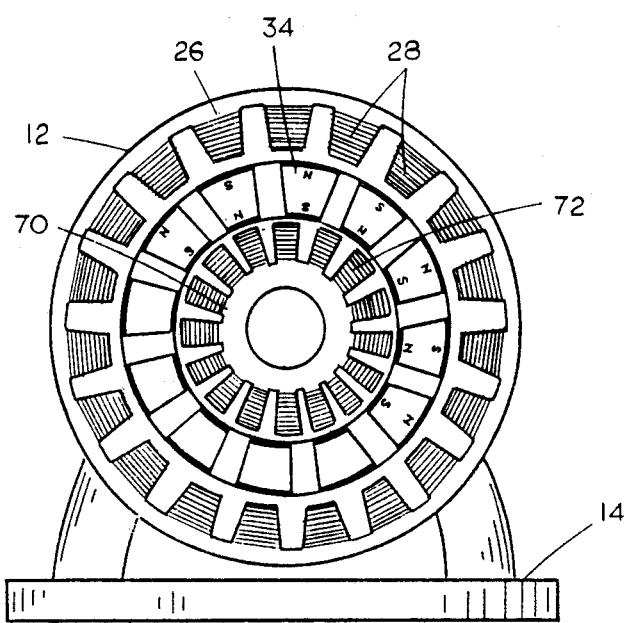
FIG. 2 is a sectional view taken at lines 2—2 in FIG. 1.
Figure 3:
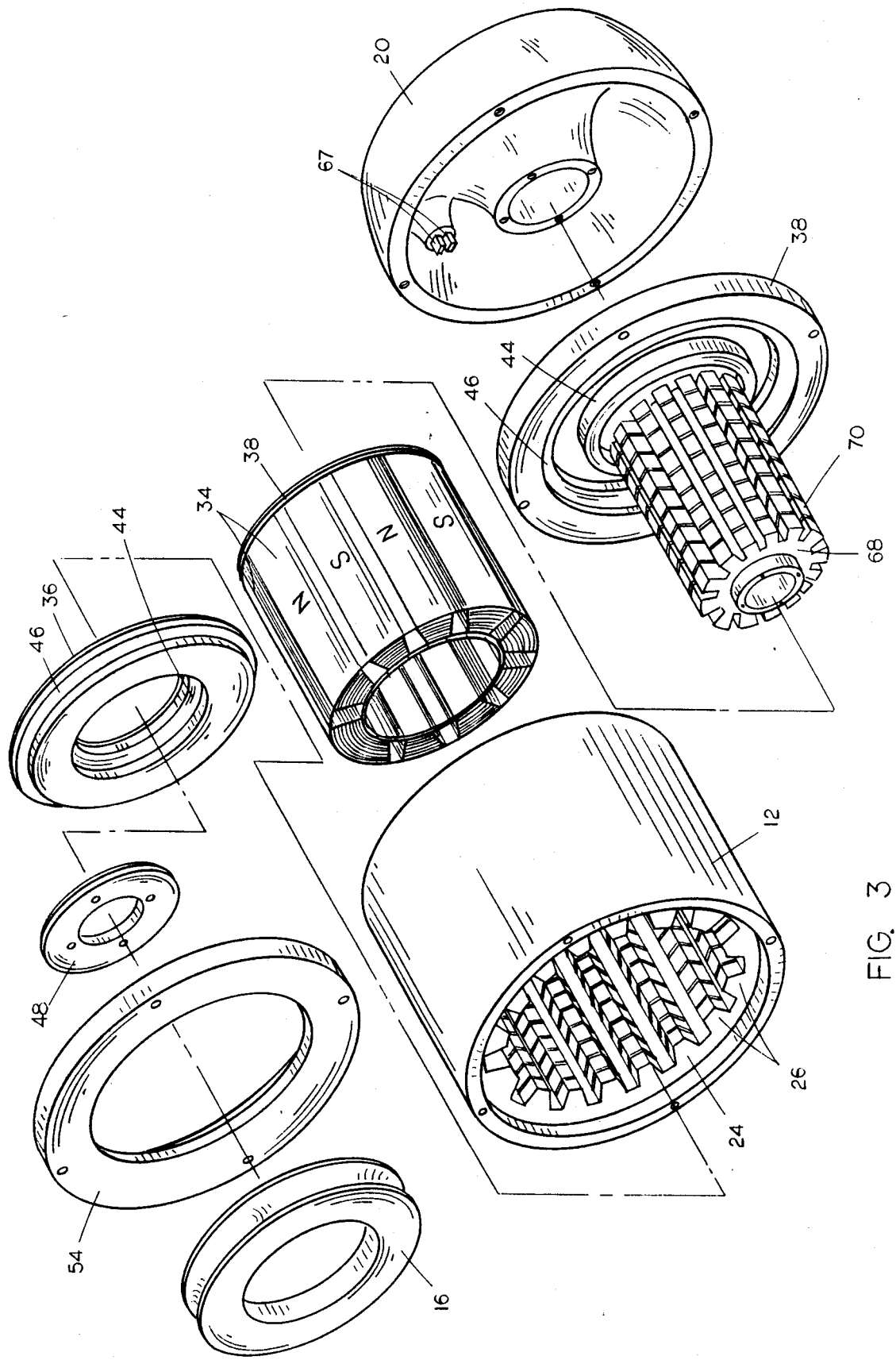
FIG. 3 is an exploded perspective view of the components of the alternator.
Figure 4:
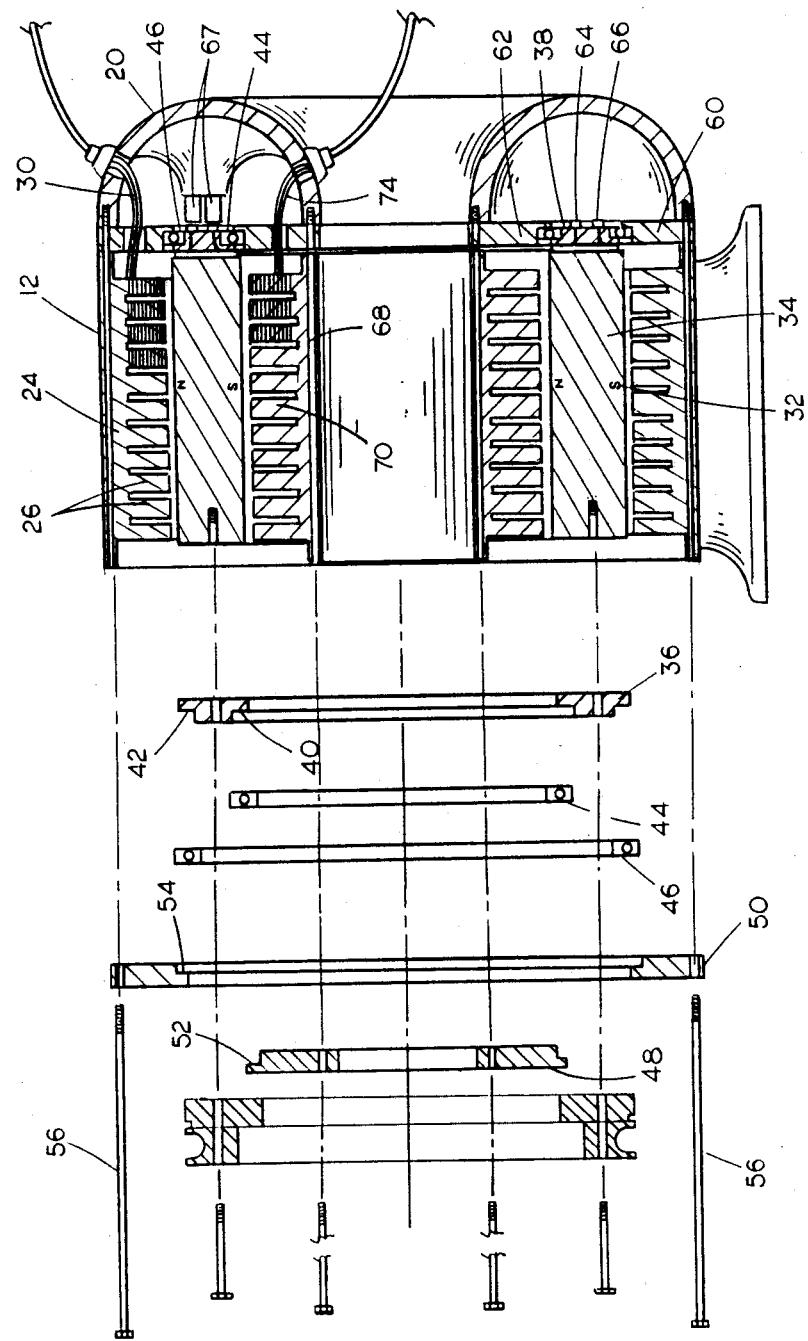
FIG. 4 is a sectional view taken at lines 4—4 in FIG. 1 with one end of the alternator shown in exploded format.

Referring now to FIGS. 2–4, housing 12 has a cylindrical soft iron core 24 mounted therein with a series of poles or teeth 26 projecting radially inwardly, in a fashion common to conventional alternators. Teeth 26 are wound with coils of conductor wire 28, as seen in FIG. 2, also in a conventional fashion. Electrical wires 30 are connected to conductor wire coils 28 in a conventional fashion and extend through rear plate 20 to conduct electricity induced in conductor wires 28 in core 24. A rotor 32 is formed of a plurality of elongated magnets 34 in a fashion similar to conventional alternators. Magnets 34 are oriented to form a hollow cylinder and are parallel and spaced apart with their outer surfaces having alternating poles, as shown in FIG. 3. While permanent magnets could be utilized, it is preferred to use electromagnets, as will be described in more detail hereinbelow. Magnets 34 are mounted between a pair of ring-shaped bearing plates 36 and 38.

FIGS. 3 and 4 show the forward end of the alternator in exploded fashion, to more clearly identify the components of the apparatus. Ring-shaped forward bearing plate 36 has its rearward surface mounted directly to magnets 34. The forward surface of bearing plate 36 has an inner annular flange 40 and an outer annular flange 42 formed in the forward surface thereof, as shown in FIG. 4. Flanges 40 and 42 will receive an inner bearing race 44 and an outer bearing race 46 respectively, which are shown on bearing plate 36 in FIG. 3. Inner and outer housing rings 48 and 50 respectively are mounted to the forward end of the alternator to retain rotor 32 therein. Inner housing ring 48 has an annular flange 52 formed in its rearward outer edge which will bear against inner bearing race 44. Outer housing ring 50 has an annular flange 54 formed along its inner rearward edge which is adapted to bear against outer bearing race 46. A plurality of elongated bolts 56 (see FIG. 4) extend through apertures in outer housing ring 50 and housing 12 so as to thread into rear plate 20 to hold the entire unit together. Similarly, elongated bolts 58 are journaled through apertures in inner housing ring 48, through an inner core (to be described in more detail hereinbelow), through a rearward inner housing ring 62 and are threaded into rear plate 20.

The rearward end of rotor 32 includes similar components, namely: rearward outer and inner housing rings 60 and 62, inner and outer bearing races 44 and 46 mounted between the flanges on the inner and outer housing rings and the flanges on the rearward bearing plate 38. In addition, an inner and an outer electrically conductive slip ring 64 and 66 respectively, as shown in FIG. 4, are mounted on the rearward surface of rearward bearing plate 38. Slip rings 64 and 66 are electrically insulated from one another and are electrically connected to the alternating inner and outer surfaces of magnets 34. In this fashion, a direct current may be supplied to one slip ring and returned through the opposing slip ring so as to form alternating electromagnetic fields in each of the plurality of magnets 34. Each magnet 34 is wired so as to produce a polarity on its outer surface which is opposite that of the outer surfaces of the two adjacent magnets 34. Similarly, the polarity of the inner surface of each magnet 34 will be opposite that of the inner surfaces of the two adjacent magnets 34. In this way, rotation of magnets 34 will cause an alternating current to be induced in wire coils 28 and 72 on outer and inner cores 24 and 68, respectively (described hereinbelow). Magnets 34 are energized through a pair of brushes 67 mounted on the interior of rear plate 20 so as to contact slip rings 64 and 66 respectively.

In conventional alternators, a shaft would extend within the housing and be connected to rotor 32 so as to rotate the rotor within core 24, and produce electricity. The present invention utilizes this space for a second soft iron core 68, in the form of a hollow cylinder. Inner core 68 is mounted within rotor 32, as shown in FIG. 4. Inner core 68 is similar to outer core 24, and has a plurality of teeth 70 projecting radially outwardly therefrom upon which conductor wire 72 (as shown in FIG. 2) is coiled. In this way, the inwardly directed poles of magnets 34 are creating a magnetic field which is cut by wire coils 72 and the outwardly directed magnetic fields of magnets 34 are cut by wire coils 28. At the same time, the interior of the alternator is hollow, thereby reducing the overall weight of the apparatus. Similar to the outer core, electrical wires 74 extend from the coiled conductor wires 72 through rear plate 20 and outwardly from the alternator (see FIGS. 2 and 4).

As shown in FIGS. 3 and 4, pulley 16 is mounted to forward bearing plate 36 and thereby to rotor 32 in the space between inner and outer housing rings 52 and 54. A belt is applied to pulley 16 and connected to a power source so as to rotate rotor 32 at the desired speed.

Whereas the invention has been shown and described in connection with the preferred embodiment thereof, it will be understood that many modifications, substitutions and additions may be made which are within the intended broad scope of the appended claims. For example, the conductor wires 72 and 28 on inner and outer cores 68 and 24, respectively, may be coiled in many different arrangements to provide a wide variety of voltages simultaneously from the same alternator. Coils 72 and 28 may also be formed to create a single very large voltage, by combining the voltages produced by the inner and outer cores 68 and 24. Similarly, the use of bearing races 44 and 46 could be modified with other equivalent structure for supporting the rotating rotor 32. It can therefore be seen that the present invention fulfills at least all of the objects stated above.

I claim:

1. An alternator, comprising:

a hollow cylindrical housing;

an outer core mounted on said housing having a plurality of teeth projecting radially inwardly therefrom;

said outer core teeth having electrically conductive wire wrapped therearound to form coils;

at least one electrical wire being connected to one or more outer core coils, and extending from said housing to conduct electricity induced in said coils;

a hollow cylindrical rotor rotatably mounted within said housing, radially inwardly of said outer core and coaxial with said housing;

said rotor having forward and rearward ends, and being mounted for rotation about the longitudinal axis of said rotor;

said rotor forward end having a ring-shaped forward bearing plate mounted thereon for rotation therewith;

said rotor rearward end having a ring-shaped rearward bearing plate mounted thereon for rotation therewith;

first bearing race means operably mounted between said forward bearing plate and said housing to rotatably bear the forward end of said rotor;

second bearing race means operably mounted between said rearward bearing plate and said housing to rotatably bear the rearward end of said rotor within said housing;

said rotor including a plurality of magnets, each magnet mounted to create a magnetic field directed radially outwardly and a magnetic field of opposite polarity directed radially inwardly;

an inner core connected to said housing and mounted radially inwardly of said rotor, said inner core having a plurality of teeth projecting radially outwardly therefrom;

said inner core teeth having electrically conductive wire wrapped therearound to form coils;

at least one electrical wire being connected to one or more inner core coils and extending from said housing to conduct electricity induced in said inner core coils; and means connected to said rotor for rotating said rotor, whereby electricity will be induced in said inner and outer core coils as the magnetic fields of said magnets are cut by said coils.

2. The alternator of claim 1, wherein said inner core is hollow and generally cylindrical in shape.

3. The alternator of claim 1, wherein said inner core coils are wrapped on said teeth so as to produce a voltage different from that of said outer core, when said rotor is rotated.

4. The alternator of claim 1, wherein said magnets are electromagnets.

5. The alternator of claim 4, further comprising:

first and second electrically conductive slip rings mounted on said rotor for rotation therewith, said slip rings being electrically insulated from one another;

said first and second slip rings being electrically connected to said magnets such that direct electrical current applied to said rings will create magnetic fields;

a pair of electrical brushes mounted on said housing, one said brush mounted in electrical contact with said first slip ring, and the second brush mounted in electrical contact with the second slip ring; and a source of direct current connected to said brushes to produce a current flow through said slip rings to said magnets while said rotor is rotating.

6. An apparatus for generating electricity, comprising:

a hollow cylindrical housing;

an outer core having a plurality of teeth projecting radially inwardly to form a cylindrical shape;

said outer core teeth having electrically conductive wire wrapped therearound to form coils;

at least one electrical wire being connected to one or more outer core coils, and extending from said outer core to conduct electricity induced in said coils from said outer core;

a hollow cylindrical rotor formed of a plurality of magnets rotatably mounted within said housing, radially inwardly of said outer core and coaxial with said housing, each magnet oriented to create a magnetic field directed radially outwardly and a magnetic field directed radially inwardly;

said rotor having forward and rearward ends, and being mounted for rotation about the longitudinal axis of said rotor;

said rotor forward end having a ring-shaped forward bearing plate mounted thereon for rotation therewith;

said rotor rearward end having a ring-shaped rearward bearing plate mounted thereon for rotation therewith;

first bearing race means operably mounted between said forward bearing plate and said housing to rotatably bear the forward end of said rotor;

second bearing race means operably mounted between said rearward bearing plate and said housing to rotatably bear the rearward end of said rotor within said housing;

an inner core connected to said outer core and mounted radially inwardly of said rotor, said inner core having a plurality of teeth projecting radially outwardly therefrom;

said inner core teeth having electrically conductive wire wrapped therearound to form coils;

at least one electrical wire being connected to one or more inner core coils and extending from said inner core to conduct electricity induced in said inner core coils from said inner core; and means connected to said rotor for rotating said rotor, whereby electricity will be induced in said inner and outer core coils as the magnetic fields of said magnets are cut by said coils.

7. The alternator of claim 1, wherein:

said first bearing race means including an outer bearing race mounted between said forward bearing plate and said outer core, and an inner bearing race operably mounted between said forward bearing plate and said inner core;

said inner and outer bearing races of said first bearing race means being concentric and spaced apart;

said means for rotating said rotor being connected to said rotor between said inner and outer bearing races of said first bearing race means;

said second bearing race means including an outer bearing race operably mounted between said rearward bearing plate and said outer core, and an inner bearing race operably mounted between said rearward bearing plate and said inner core;

said inner and outer bearing races of said second bearing race means being concentric and spaced apart.

8. The alternator of claim 2, wherein said cylindrical housing has forward and rearward ends and an aperture extending through the center of said forward and rearward ends of a diameter substantially the same as the hollow portion of said inner core, to provide dissipation of heat through air flow through said hollow core.

* * * * *